United States Patent
Tougas et al.

(10) Patent No.: US 12,189,732 B1
(45) Date of Patent: Jan. 7, 2025

(54) AUDIO TOKEN-BASED AUTHENTICATION METHOD AND SYSTEM

(71) Applicant: UIPCO, LLC, San Antonio, TX (US)

(72) Inventors: Brian Tougas, Spring Branch, TX (US); William Daniel Farmer, Carrollton, TX (US); Ruthie D. Lyle, Durham, NC (US); Kelly Q. Baker, San Antonio, TX (US); Ryan Thomas Russell, San Antonio, TX (US); Noe Alberto Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 590 days.

(21) Appl. No.: 17/199,022

(22) Filed: Mar. 11, 2021

(51) Int. Cl.
G06F 21/00 (2013.01)
G06F 21/32 (2013.01)
G10L 17/06 (2013.01)
H04N 7/15 (2006.01)

(52) U.S. Cl.
CPC .............. G06F 21/32 (2013.01); G10L 17/06 (2013.01); H04N 7/15 (2013.01)

(58) Field of Classification Search
CPC ....... G06F 21/32; G06Q 50/265; G10L 17/00; G10L 17/06; G10L 25/51; G16H 40/20
See application file for complete search history.

(56) References Cited

U.S. PATENT DOCUMENTS

| | | | |
|---|---|---|---|
| 2011/0219427 A1* | 9/2011 | Hito | H04L 63/0853 726/3 |
| 2015/0215299 A1* | 7/2015 | Burch | H04W 12/069 726/5 |
| 2016/0241555 A1* | 8/2016 | Vo | G06F 21/32 |
| 2018/0115560 A1* | 4/2018 | Green | H04L 63/102 |
| 2019/0362064 A1* | 11/2019 | Zhang | G06F 21/35 |
| 2020/0034521 A1* | 1/2020 | Teng | H04L 63/083 |
| 2020/0059468 A1* | 2/2020 | Wolosewicz | G10L 15/22 |
| 2020/0335106 A1* | 10/2020 | Pratt | G10L 15/32 |
| 2021/0385205 A1* | 12/2021 | Dunjic | H04W 12/65 |
| 2022/0391480 A1* | 12/2022 | Schweinfurth | G16H 40/20 |

* cited by examiner

*Primary Examiner* — William A Corum, Jr.
(74) *Attorney, Agent, or Firm* — Plumsea Law Group, LLC (57) ABSTRACT

A sound-based method and system of performing an authentication of a person in order to permit access to a secured resource is disclosed. The system and method are configured to transmit an audio signal to a remotely located smart device. When the smart device produces the audio signal, a nearby computing device captures the audio signal and provides the captured audio data to an authentication platform. The audio data is compared to the transmitted audio signal. The system can determine whether there is a match between the captured audio data and the transmitted audio data. If there is a match, the system verifies an identity of the person and can further be configured to automatically grant the person access to one or more services, features, or information for which he or she is authorized.

20 Claims, 8 Drawing Sheets

AUDIO TOKEN-BASED AUTHENTICATION METHOD AND SYSTEM

TECHNICAL FIELD

The present disclosure generally relates to identity authentication, and specifically to a method and system for authentication of a person seeking access to one or more secured services, features, and resources. The authentication is based on analysis of a sound sample produced in the physical environment occupied by the person.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of authenticating an identity of an individual is disclosed. The method includes a first step of transmitting, at a first time, a first audio signal to a first smart device located in a first (physical) space such as a room in a residence or other building, an outdoor space, or vehicle interior. A second step includes of obtaining first audio data captured by a first computing device associated with a first user. The first audio data includes a recording of a second audio signal. A third step includes determining that the first audio signal and the second audio signal are sufficiently similar to be classified as a match. In addition, a fourth step includes determining, in response to classifying the first audio signal as matching the second audio signal, that the first user has a first user identity, and a fifth step of thereby authenticating the first user for access to a secured resource for which the first user identity is authorized In another aspect, another method of authenticating an identity of an individual is disclosed. The method includes a first step of receiving access information for a first smart device located in a first space, and a second step of registering the first smart device with the access information in a first record linked to a first user identity. In addition, the method includes a third step of receiving a request for access to a secured resource from a first user purporting to have the first user identity, and a fourth step of retrieving, in response to the request, the first record. A fifth step includes transmitting a first audio signal to the first smart device using the access information, and a sixth step includes receiving data including a second audio signal from a first user device of the first user. In addition, a seventh step includes permitting or enabling the first user access to the secured resource if or when the first audio signal and the second audio signal are deemed sufficiently similar to be classified as a match.

In another aspect, a system for authenticating an identity of an individual includes a processor and machine-readable media. The machine-readable media include instructions which, when executed by the processor, cause the processor to transmit, at a first time, a first audio signal to a first smart device located in a first space, and to obtain first audio data captured by a first computing device associated with a first user, the first audio data including a recording of a second audio signal. In addition, the instructions cause the processor to determine that the first audio signal and the second audio signal are sufficiently similar to be classified as a match, and then to determine, in response to classifying the first audio signal as matching the second audio signal, that the first user has a first user identity. The instructions further cause the processor to authenticate the first person for access to a secured resource for which the first user identity is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a method and system allowing users to be authenticated in a more secure and more efficient manner. As described in greater detail below, an authentication process and system based on audio data from the environment or physical space occupied by the user may be utilized for reducing and in some cases eliminating the need for users to present credentials, input passwords, or otherwise offer identity tokens or factors, and/or provide account holders with an additional layer of security. The proposed system takes advantage of the increasing reliance on teleconferencing and the growing availability of microphones and smart devices in the day-to-day life of the modern consumer. By triggering the generation of audio from a computing device in the user's environment, and then capturing audio information through the user's own device, user service sessions can be securely authenticated by confirming the user is in fact at the location he or she has indicated or as indicated by the user's device. These sounds can represent a type of audio-based security token for the user. In one example, such authentication can be performed by confirming that the sound(s) generated by the system are present in the background of the user prior to permitting access to a secure resource.

It may be appreciated that the proposed embodiments can be advantageous in combating the growing threat of forgery. For example, deep fake algorithms in particular are becoming increasingly sophisticated. By generating a voice and/or face through a deep learning neural network, such algorithms are able to replace a real person with an imposter fake face/voice in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, etc.; and (c) biometric factors, such as voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior. In other words, walking and moving from one location to another are passive interactions, as the person would perform these activities regardless of the authentication system that is in place. However, other user actions, such as but not limited to providing a voice command, passcode, retinal scan, carrying and presenting an identification credential or token, fingerprint scan, etc. are active inputs and a system requiring any of these types of information would not be considered passive.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services.

As used herein, the term "customer service representative" (or simply, "representative") refers to any individual operating in a capacity to represent a service provider in interactions with a customer or user. The representative could be, for example, an employee at call center or a contractor or other person acting on behalf of call center for the service provider. Additionally, representatives may be physically present at call center and/or may be located remotely from call center and have calls routed through a computer system at call center to connect customers with the representative. A representative could operate within a larger customer service system (or department) of the service provider. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood tor refer to any end-user or person requesting or receiving assistance or other communications from a secured system, including via a communication session with a remote agent. The customer can view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and can serve as a barrier to deep fake imposter attacks.

Figure 1:
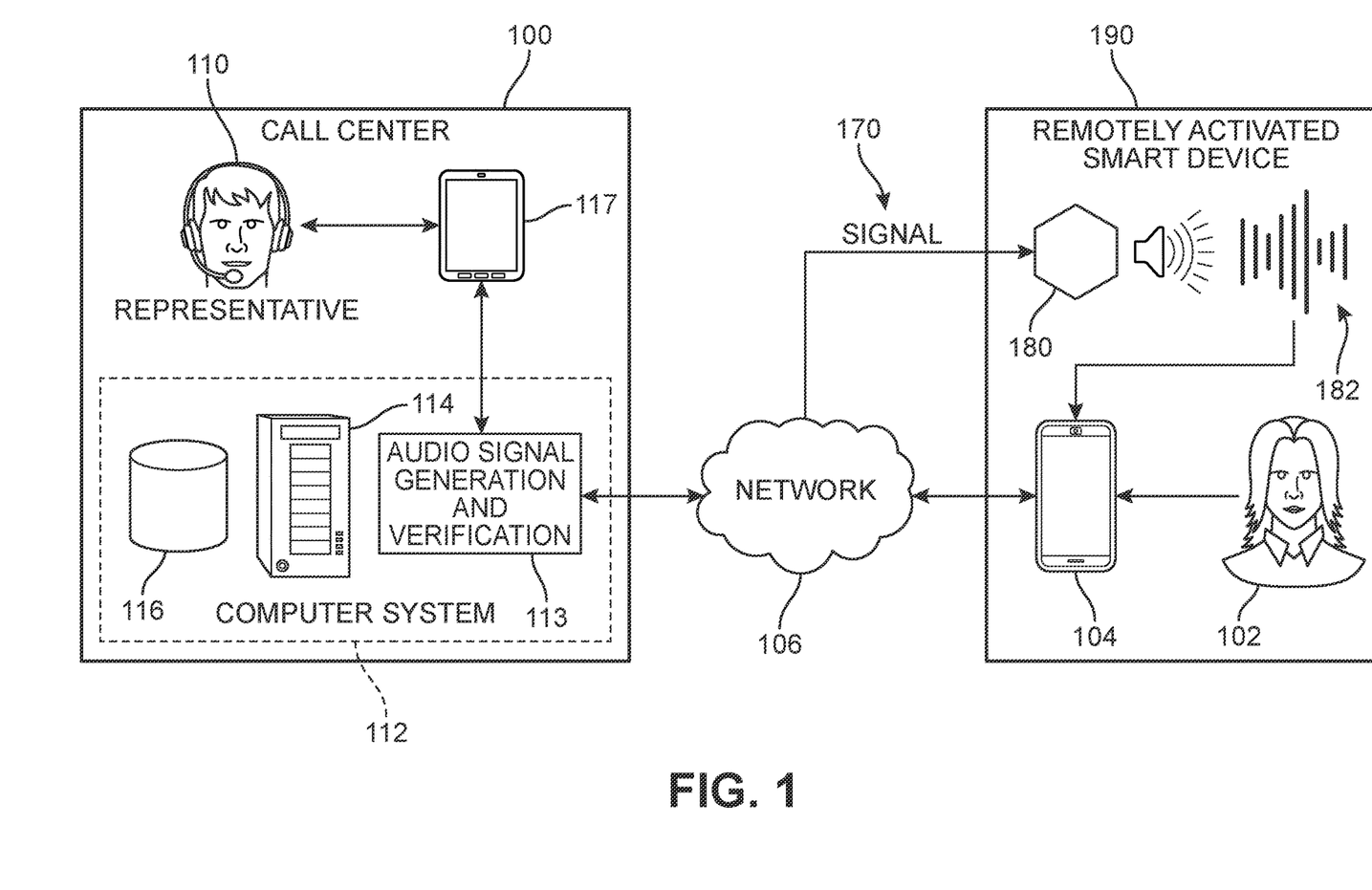
FIG. 1 is a schematic overview of an authentication process in which audio data from a user's device as well as audio data generated in the environment near the user is obtained in order to authenticate the user, according to an embodiment.

For purposes of introduction, an overview of one embodiment of the proposed systems and methods is illustrated with reference to FIG. 1. In FIG. 1, an example of an authentication process is shown in which a first user 102, in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection, depending on the mechanism utilized for data transmission.

In some embodiments, first user 102 may have access to a user device 104. In one embodiment, user device 104 is a mobile device, for example, a smartphone or a tablet computer. In other embodiments, however, user device 104 could include a telephone (e.g., landline and/or cellular), a tablet, a laptop, a desktop computer, or similar kind of device that allows user 102 to contact call center 100. In this case the first user 102 is speaking and listening to the representative 110 via a mobile phone device. However, in other embodiments, no computing device is necessary to implement the disclosed systems, and a traditional telephone service may be used by the customer or other caller. For purposes of this example, the first customer 102 has just been connected to representative 110 and is seeking access to their account details.

In different embodiments, the user device 104 can include an electronics unit comprising a plurality of different components, such as a user interface component (e.g., a touchscreen display, keyboard, mouse, microphone, speaker, etc.), a user interface module, a processor, and/or a communication module. The user device 104 may include a system including one or more processors and memory. Memory may comprise a non-transitory computer readable medium. Instructions stored within memory may be executed by the one or more processors. The user device 104 may be configured to receive and analyze data from various input sensors associated the user device 104 or data that is communicated from external components or devices to user device 104. In some cases, the user device 104 may also include a navigation system equipped with a GPS receiver that can receive GPS information or other receivers capable of receiving global or local positioning information.

A communication module may allow the user device 104 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the user device 104 includes a device display ("display") that can, for example, present information and media for a product/service support software application ("app"). In some embodiments, the app is associated with the provider of the product/service for which the service representative is offering support. In some embodiments, the first user 102 can receive and send information through a user interface that may be presented on the device display. In some embodiments, the display may be a touchscreen, allowing the customer to interact with the user interface directly by touch. The user interface may refer to an operating system user interface or the interface of one or more software applications that may run on the user device 104. In some embodiments, the user interface can include a messaging window or other chat-space by which the service representative may send messages or other digital content. Alternatively, in some embodiments, the first user 102 can also speak with the service representative via a voice calling application on user device 104, or directly through a telephone or other external device.

In an example embodiment, customer service call center 100 includes at least one computer system 112. The term "computer system" refers to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. In an example embodiment, computer system 112 may also include or be configured with access to an access management platform (see FIG. 2), of which an audio signal generation and verification module ("audio module") 113 is a component. In some embodiments, audio module 113 may be implemented in software, hardware, or a combination thereof.

In different embodiments, while the first user 102 is communicating with representative 110, the access management system can be configured to verify an identify of a person so as to either permit or deny access to the user-identity dependent services. As used herein, the term "user" or "member" or "account holder" should be understood tor refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls.

In some embodiments, representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, send documents and forms to a customer, provide access to a secured resource, and/or perform other tasks required to help a customer calling in to call center 100.

In some embodiments, both representative device 117 and user device 104 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 104 could operate in a client-server relationship with one or more servers of computer system 112. For example, computer system 112 may include a server that communicates with user device 104 as well as other remote devices (e.g., user devices of other customers) over a network 106. User device 104 may provide the front-end of a system that provides users with options for performing various kinds of tasks (for example, making fund transfers when the company is a bank). In some cases, user device 104 may run client software through a web browser, in which case the client software may be hosted on a server associated with computer system 112. In other cases, user device 104 may run client software in the form of a native software application that has been downloaded through a centralized marketplace (i.e., an "app store"). In some cases, while the client software that allows users to perform various tasks may be run on user device 104, the data may be retrieved from and stored on databases associated with computer system 112 (e.g., databases 116).

During the call between representative 110 and first user 102, the first user 130 requests access to her account or other secured resource. In response, the remote access management system can automatically, or at the request of the service representative, initiate an authentication event, action, or task. In different embodiments, the access management system, through audio module 113, can then generate one or more signals 170 that are transmitted over network 106. The signals 170 can include a specific audio sample, as well as a request to emit that audio sample. The signals 170 are received by a first smart device 180 that is located in the local environment of first location 190. In response to the signals 170, the first smart device 180 produces a sound 182 that corresponds to playback of audio sample transmitted by the audio module 113.

At or around the same time, the audio module 113 also requests or triggers a capture of a sample of audio data by a microphone of (or connected to) user device 104. This captured audio data can include ambient sounds from the user's environment, as well as the sound 182 produced by first smart device 180. In general, the term ambient noise information or ambient sounds refer to the sound profile collected for a particular location or space during normal, day-to-day use of such space. A physical space can refer to any physical environment such as a room in an office, residence, or other building, as well as open or outdoor spaces. The captured audio data is received by the remote access management system via network 106.

Based on the received audio data, the system will determine whether there is a match between the two audio samples. If a match between the original audio sample and the received audio data is detected, the user's location can be verified, providing an additional layer of veracity to the user's identity. In this example, sound 182 is a match for the audio sample, and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the ambient sound data captured for the environment around first user 102.

Figure 2:
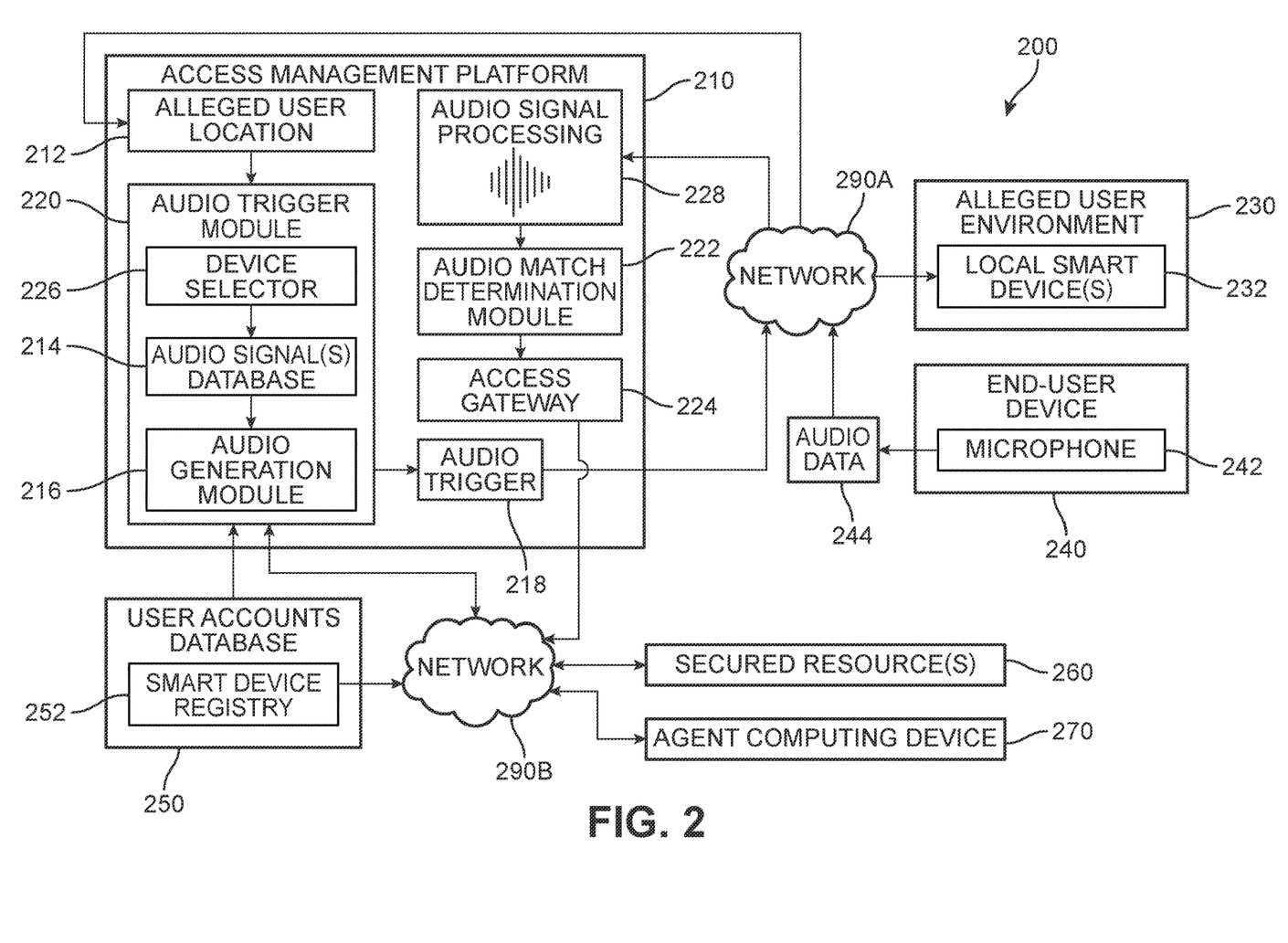
FIG. 2 is an overview of an architecture of an audio-based authentication system, according to an embodiment.

For purposes of clarity, an overview of a system architecture ("architecture") 200 for an embodiment of an access management system is depicted in FIG. 2. It should be understood that the architecture 200 as presented is for purposes of illustration only, and other embodiments may utilize different or additional components or processes. The architecture 200 may alternatively include additional, fewer, or different components. For example, the architecture 200 may include additional storage devices, additional servers, additional computing devices, and other features not shown in FIG. 2.

In FIG. 2, the architecture 200 can be seen to include an access management platform ("platform") 210, an end-user device ("user device") 240, and an optional agent computing device ("agent device") 270. In some embodiments, the platform 210 includes or is configured to communicate with a user accounts database ("database") 250. Furthermore, in different embodiments, architecture 200 includes access to devices in alleged user environment 230 (e.g., smart devices or other Internet-of-Things (IoT) type devices). For example, such smart devices can include any device which has the capability to connect with the internet and is integrated with technology like sensors, functional software, etc. which support network connections and permit remote commands/control via a network connection.

Devices and components of architecture 200 can communicate with each other and with other components of architecture 200 over one or more networks (shown here as 290A and 290B, and referred to collectively herein as 290). The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

In different embodiments, agent device 270 and user device 240, as well as platform 210 can be configured to work in conjunction with a telephony/videoconferencing application ("application") such as a telephone connection or teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, the application can be configured to present various interfaces by which administrator or other users can interact with features of platform 210. In some embodiments, the application is proprietary to the service provider for which the agent is a representative.

In different embodiments, the platform 210 is capable of communicating with external devices such as agent device 270 (also referred to herein as an administrator computer) and the user device 240 (also referred to herein as the audio capture device) through the network 290 using wired or wireless communication capabilities. The platform 210 can be understood to comprise a server and, along with the agent device 270, may include computing devices comprising any number of components, such as a Network Interface Card (NIC), allowing the respective devices to receive, transmit, process, and store information obtained from the image capture devices. In other words, the architecture 200 may include groups or subgroups of computing devices that can communicate with each other, but not necessarily with the computing devices in other groups or subgroups. The architecture 200 may include computing devices of disparate types, having different types of hardware and software configurations and in a variety of different locations. In some cases, multiple devices or subsystems can be identified together as a single computing device.

In different embodiments, the platform 210 includes or is configured to access one or more databases, such as member profile or user accounts database 250. The user accounts database 250 is a content library that stores account data related to one or more users. The data may include, for a plurality of users, name, personal and professional details, current and past policy for the user, credit limit of users, among other details, depending in part on the type of services being provided by the service provider. In one embodiment, user accounts database 250 includes a registry 252 of smart devices for each end-user subscribed to the audio-token authentication feature. The registry 252 identifies one or more smart devices located in the user's personal space (e.g., residence, workplace, vehicle, etc.) that are equipped with or have a connection to a speaker. The end-user has also provided consent to the system for remote access of each of these registered devices as appropriate. For example, a user may have a smart virtual assistant device (e.g., Amazon Echo®, Google Home®, etc.) in their home. The end-user can permit the system (e.g., components of platform 210 and/or agent device 270) access to their smart devices for authentication purposes.

In some embodiments, a user may opt to register multiple smart devices with his or her account. For example, the user may have one smart device saved in the registry 252 for when he/she is in the basement of their home, another for when he/she is on the main floor, and another at their mother's house where they are frequently visiting, etc. The user can identify the location in which the device is stationed, and the system can tag the device listing accordingly.

In addition, in different embodiments, the user may opt to provide smart device updates at different intervals. For example, the user may move residences or change jobs, purchase and/or replace smart devices, or experience some other change that may affect the validity of the device access as previously stored, and therefore he/she may request to submit new device data. In other cases, the merchant or other authentication entity may require or recommend that participants provide updated device information twice a year, once a month, or at other less or more frequent intervals to ensure the smart device(s) that are stored is up-to-date. In one embodiment, the smart device listing and associated consent can be linked to an expiration date or period of time after which the participant will be required to provide new (current) device data. In some embodiments, an account for the customer verifying their identification credentials can also be linked to the customer's smart device at or around that time. Thus, a verification process may occur in conjunction with the collection of the initial smart device listing for that user, whereby the participant presents identity documents that can be used to confirm the user's identity. The user identity can then be linked to the identified smart device in the record. These devices can be accessed by platform 210 to generate verification audio, as will be discussed below.

The platform 210, agent device 270, and user device 240 may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, watches, glasses, laptops, notebooks, tablets, and others, and can include work stations, mainframes, non-portable computing systems, devices installed in structures, vehicles, and other types of installations.

In different embodiments, the user device 240 may further include a microprocessor, a communication unit, random access memory (RAM), non-volatile memory, a display, one or more auxiliary input/output (I/O) devices, a data port, a keyboard, a speaker, a microphone 242, a short-range wireless communications subsystem, a rechargeable battery, a battery interface, and possibly other components. The user device 240 may include fewer, additional, or different features, which may be arranged and may operate in the manner shown or in a different manner. The user device 240 may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or other.

In some embodiments, user device 240 includes a GPS receiver that can receive GPS information or other receivers capable of receiving global or local positioning information. In other embodiments the user may communicate their location directly (e.g., via message or voice). This alleged (i.e., purported, unverified) user location information 212 can be submitted to the platform 210 and received by an audio trigger module 220. The audio trigger module 220 is configured to evaluate the alleged user location information 212 and determine whether there are on-site smart devices registered for the user via access to registry 252. For example, the audio trigger module 220 can check whether the location includes any personal computing devices that are running an instance of the proprietary app (app-enabled devices 224) and have consented to sound production, as well as any on-site/local smart devices 232. In this case, local smart devices 232 refer to devices that that are in the vicinity of the user's alleged location and are capable of producing sound, based in part by reference to registry 252.

If the audio trigger module 220 identifies devices 232 on-site and available in the alleged user environment 230, it may select a device via device selector 226 for playback of a specific sound. The audio signal for playback by the designated device can be selected randomly or in accordance with system settings by reference to an audio signal(s) database 214. The audio signal(s) database 214 includes one or more audio signals that may be used for verification purposes. These signals may be a few seconds in duration, or a few minutes in duration. In some embodiments, the signals are configured to be audible, and playback will occur when both the user and agent are silent. In some other embodiments, the signals can be inaudible to the human ear, but will be picked up by the microphone 242. For example, there are sounds that have been designed to be completely inaudible to humans (40 KHz or above), yet are audible to any microphone. Such sounds combine multiple tones that, when interacting with the microphone's mechanics, create a "shadow", which is a sound that the microphones can detect. When the smart device emits the sound, it will be played as an inaudible signal that translates to white noise or some other sound in the microphone 242. In other embodiments, ultrasonic frequencies may be transmitted to the smart device that will be picked up by the microphone 242.

Once the device and signal have been selected, an audio generation module 216 is configured to issue a playback request ("audio trigger") 218 that includes information enabling the system to connect to the selected local smart device 232, as well as the selected audio sample. As noted above, in different embodiments, the user device 240 includes microphone 242 that is linked to or otherwise integrated within a unit configured to capturing sounds in user environment 230. When a user requests access to a secured resource, for example via a user interface presented on user device 240 via network 290, the audio trigger 218 may be generated by platform 210, initiating the playback of sound from the nearby smart device. In some embodiments, user device 240 is configured to send captured audio content (audio data 244)—including the sound produced by the smart device—to remote facilities such as the platform 210 and/or the agent device 282.

In different embodiments, audio signal processing algorithms and/or software (e.g., audio signal processing module 228) may reside in user device 240, platform 210, agent device 270, and/or other devices of architecture 200 for pre-processing and processing of the captured user audio data 244. The algorithms can use some combination of time and frequency to determine whether two audio samples match. In one embodiment, the platform 210 is configured to compare the user's audio sample (user audio data 244) against the reference audio sample (i.e., the selected audio signal that was delivered to the smart device). If the samples match within certain parameters, the user is deemed to pass the authentication or verification test, indicating that the user is indeed at the alleged location.

In some embodiments, the user audio data 244 is processed and models or representations of the sample of audio are built. These models are compared against one another. In different embodiments, one or both samples may be deemed unacceptable or unusable if the sample is too loud or too soft (amplitude), or if there is too much noise (poor signal to noise ratio). If a sample is not acceptable the system may request an additional or further sample and again trigger generation of audio from the smart device (either the same audio signal or a different/new audio signal).

If the samples are acceptable or sufficient, a scoring occurs via audio match determination module 222. The scoring process is analogous to "what is the probability that the sounds captured by the user device are the same as the verification sample that was provided to the smart device by the platform?" Thus, in some embodiments, the determination of a "match" is not necessarily based on the verification/reference sample directly or exactly matching the content of the user audio sample, but rather on the two samples being substantially similar or sharing particular features. The returned score is evaluated against a threshold value to determine if it meets or exceeds the minimum acceptable score by access gateway 224. If the score is determined to be successful, the platform 210 and/or agent may allow a user to proceed further within a call center or telephone banking menu system or other secured resource 260 being safeguarded by the service provider. In other embodiments, audio match determination module 222 can be configured such that the captured audio must directly correspond to the audio signal in order for a match identification to occur.

Thus, the two audio data samples are compared by the audio match determination module 222, and if a match is found or is in an acceptable range, the access to secured resource(s) 260 by the user will be allowed and/or enabled by access gateway 224. Otherwise, access is denied, pending further verification. Thus, authentication based on verification of the user's location using an audio security token provided by the system for playback at the user's alleged location strongly implies that the user's identity is true and correspondingly is in fact entitled to whatever access is being requested. It should be understood that while the platform 210 bases access decisions at least in part on the detection of the designated object token, the system is further configured to first confirm that the user ID and optional password match based on information available in the user accounts database 250.

Although not shown in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 270 can be connected to or include an internet customer interface for providing support specifically to customers or members who contact them via the Internet. As a general matter, support agents or service representatives can refer to any person or personnel who offers the caller (or person who was called) assistance, and has access to the platform 210 during the communication session with the customer.

Referring now to FIGS. 3-7, an example of an authentication process of a user identity that may occur using some of the proposed systems is depicted. In this case, a second user 322 is engaged in a virtual communication session with a service agent ("agent") 312 who is located in a remote location relative to second user 322, such as a call center 310. In different embodiments, the agent 312 may be human or provided as an automated chatbot or virtual assistant. The second user 322 is speaking to the agent 312 over a network connection ("network") 350 using a computing device (here shown as a smart phone/mobile device 324), and the agent 312 is responding over a computer-based telephony system 314 that includes or otherwise has access to an embodiment of an access management platform (e.g., see platform 210 in FIG. 2). In other embodiments, the communication can occur in part or fully via a telephonic system whereby one or both of the agent 312 and second user 322 speak in real-time by telephone.

Figure 3:
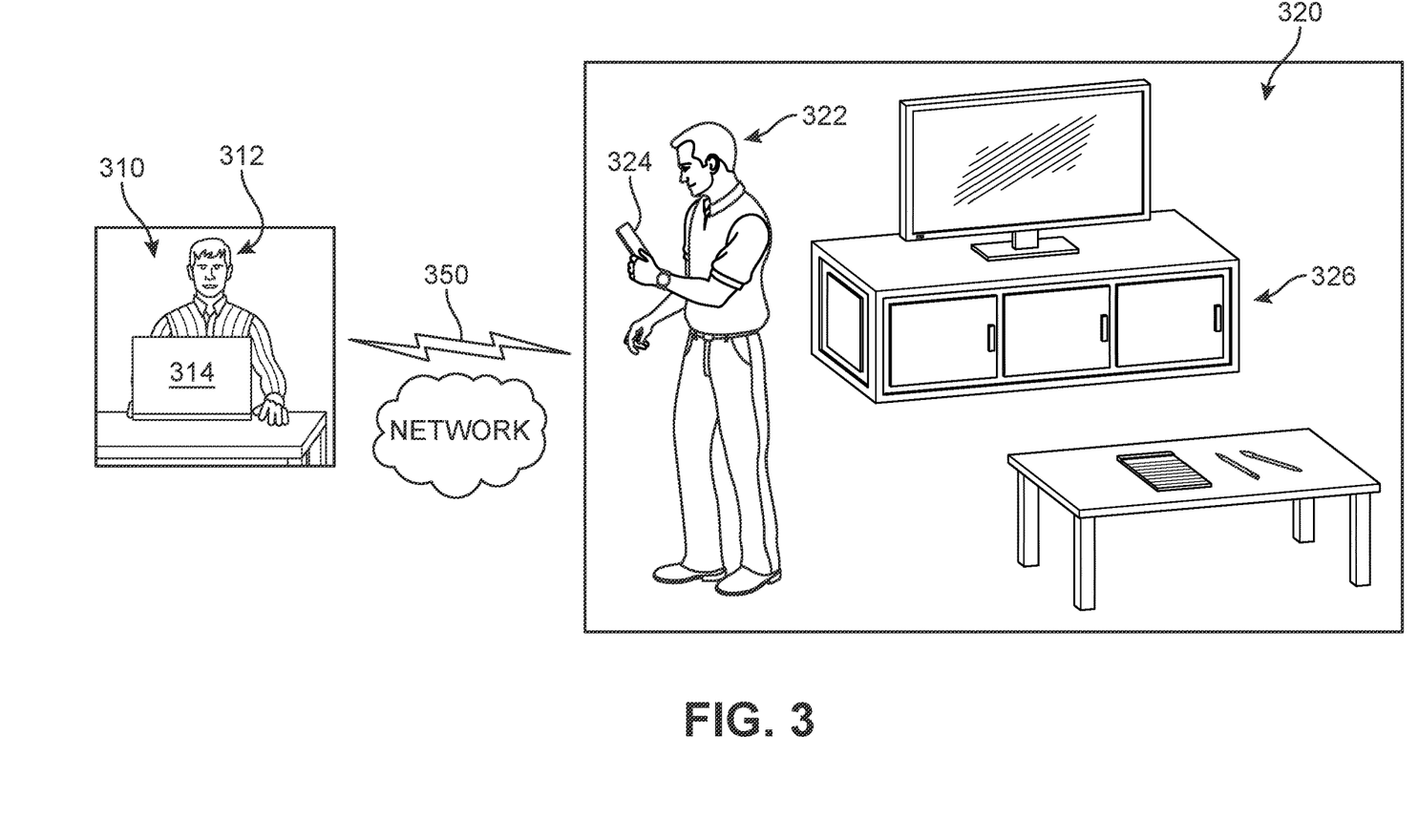
FIG. 3 depicts an example of a person contacting a service representative for access to a secured resource, according to an embodiment.

During the session, the second user 322 requests access to or actions dependent on sensitive or otherwise secured information associated with his account. In order to proceed, the access management system requires the second user 322 be authenticated. In one embodiment, the access management system can generate a reminder or other message to the second user 322 via smart phone 324 that audio from the device's microphone will now be captured and recorded, and/or the support agent may convey a similar message to second user 322 by voice or chat. In different embodiments, users of the authentication system described herein can be understood to have provided their consent to the audio-based authentication process at the time of their original account activation or enrollment with the additional security layer procedure. It can be understood that the current session is occurring at a time subsequent to the smart device enrollment/submission stage described earlier. In other words, the account holder identity that second user 322 is claiming to have has previously provided smart device data for one or more smart devices in their personal space(s) with the goal of enrolling or registering himself in this particular authentication technique, and the smart device(s) that were acquired at that time are stored in a record in a database accessible by the depicted authentication system.

In FIG. 3, the second user 322 has indicated to the agent 312 that he is calling from their home or residence 320. This assertion may also be conveyed via a location detection component (e.g., GPS) associated with the user's communication device, or a location identification capacity associated with the call center 310 communication systems. In addition, in some cases, the second user 322 may be in a room or space (e.g., a living room or den 326) in which the registered smart device is not present. In such cases, the agent 312 may recommend that the user move to a room or space in which a registered smart device is located.

Figure 4:
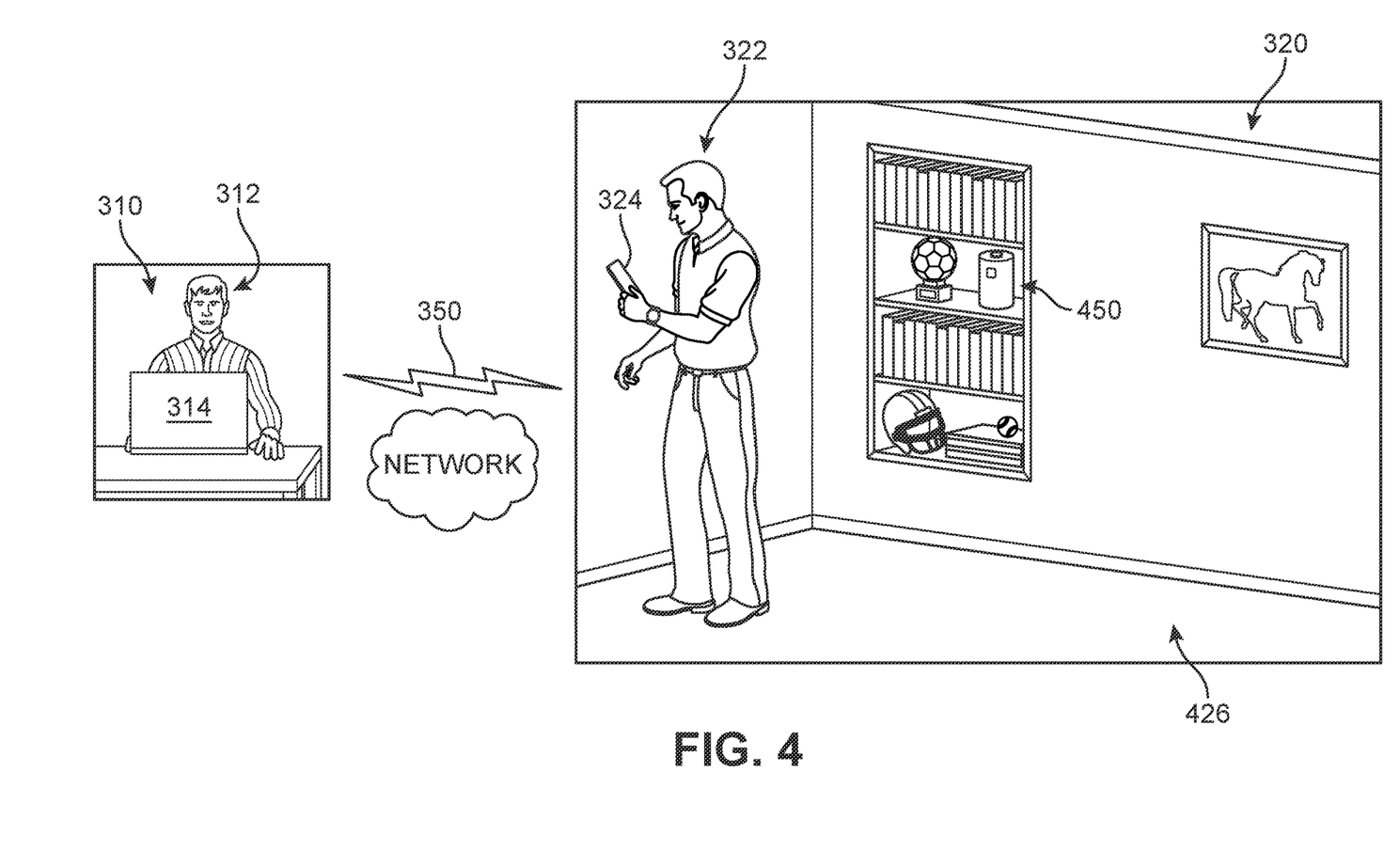
FIG. 4 is an illustration of the person of FIG. 3 having moved to a second physical space in which an external smart device is located, according to an embodiment.

This is reflected in FIG. 4, where the second user 322 has walked to an adjacent room (e.g., a study or bedroom 426). In the bedroom 426, a smart device 450 is disposed on a bookshelf. This smart device 450 has been previously enrolled or registered with the access management authentication system. The second user 322 may then inform the agent 312 he is within acceptable range/proximity of the smart device 450 (the range may vary based on the speaker amplitude and microphone type, and can be conveyed to the user so he/she can move to a more appropriate distance from the smart device 450).

Figure 5:
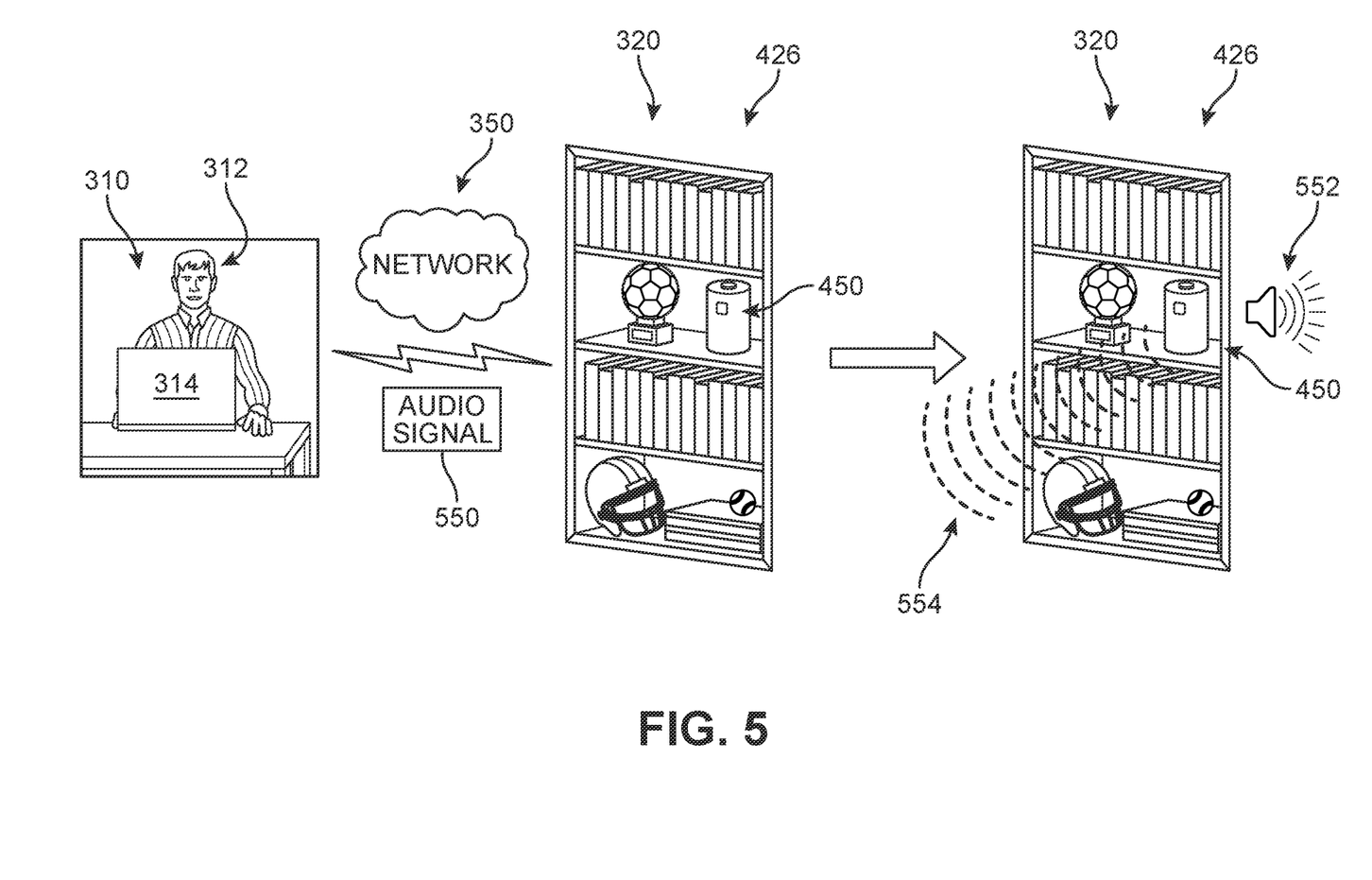
FIG. 5 depicts an example of the access management system generating a signal that is transmitted to the smart device, thereby causing the smart device to emit a sound.

As noted earlier, fraudulent calls can readily hide a caller's true location by use of various spoofing techniques, making such identifications unreliable. However, as shown in FIG. 5, embodiments of the proposed system can be configured to initiate a location-check procedure based on the capture of audio through second user's microphone. The system may automatically initiate the authentication process, or it may be manually initiated by the agent. In FIG. 5, the agent 312 requests that the system begin the authentication process (described in greater detail in FIG. 2). In response, the system generates an audio signal 550 (including both the smart device commands and selected audio that should be produced) that is transmitted over network 350 to the user's residence 320. More specifically, the audio signal 550 is transmitted directly to the smart device 450 located in bedroom 426. In response, as shown in the sequence following the arrow, the smart device 450 is activated 552 and begins to emit an audio sample 554.

Figure 6:
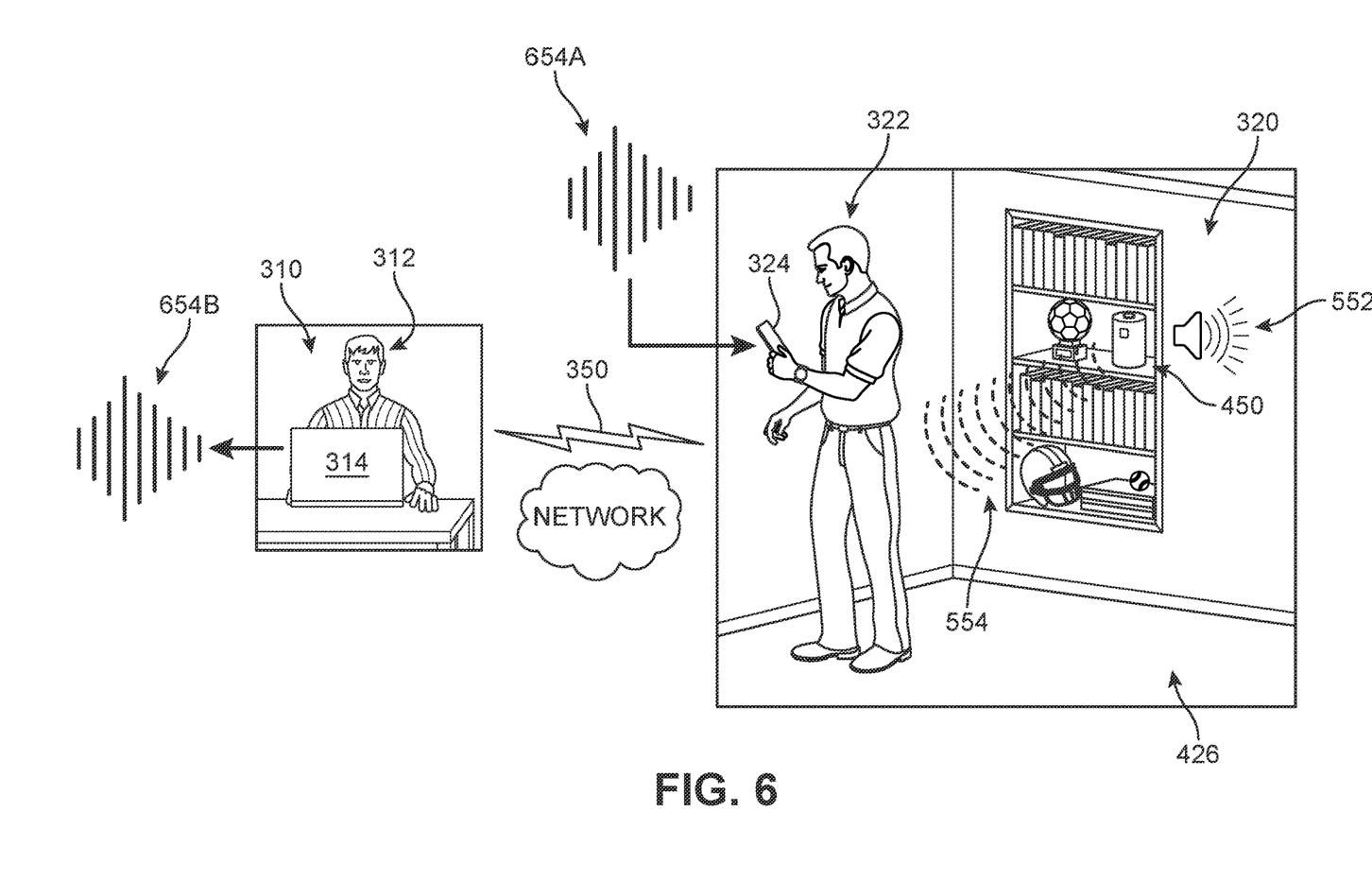
FIG. 6 is an illustration of the person engaged in a communication session with the service representative while audio data from the user's computing device is obtained, according to an embodiment.

Referring now to FIG. 6, a larger context is presented in which the second user 322 is holding smart phone 324 as the microphone for smart phone 324 captures the ambient sounds of bedroom 426, as well as the emitted audio sample 554. In some examples, the audio may be captured while neither the user nor the agent is not speaking. The audio sample 554 is captured by the user's microphone as captured audio data 654A and provided to the remote system via network 350 as transmitted audio data 654B.

Figure 7:
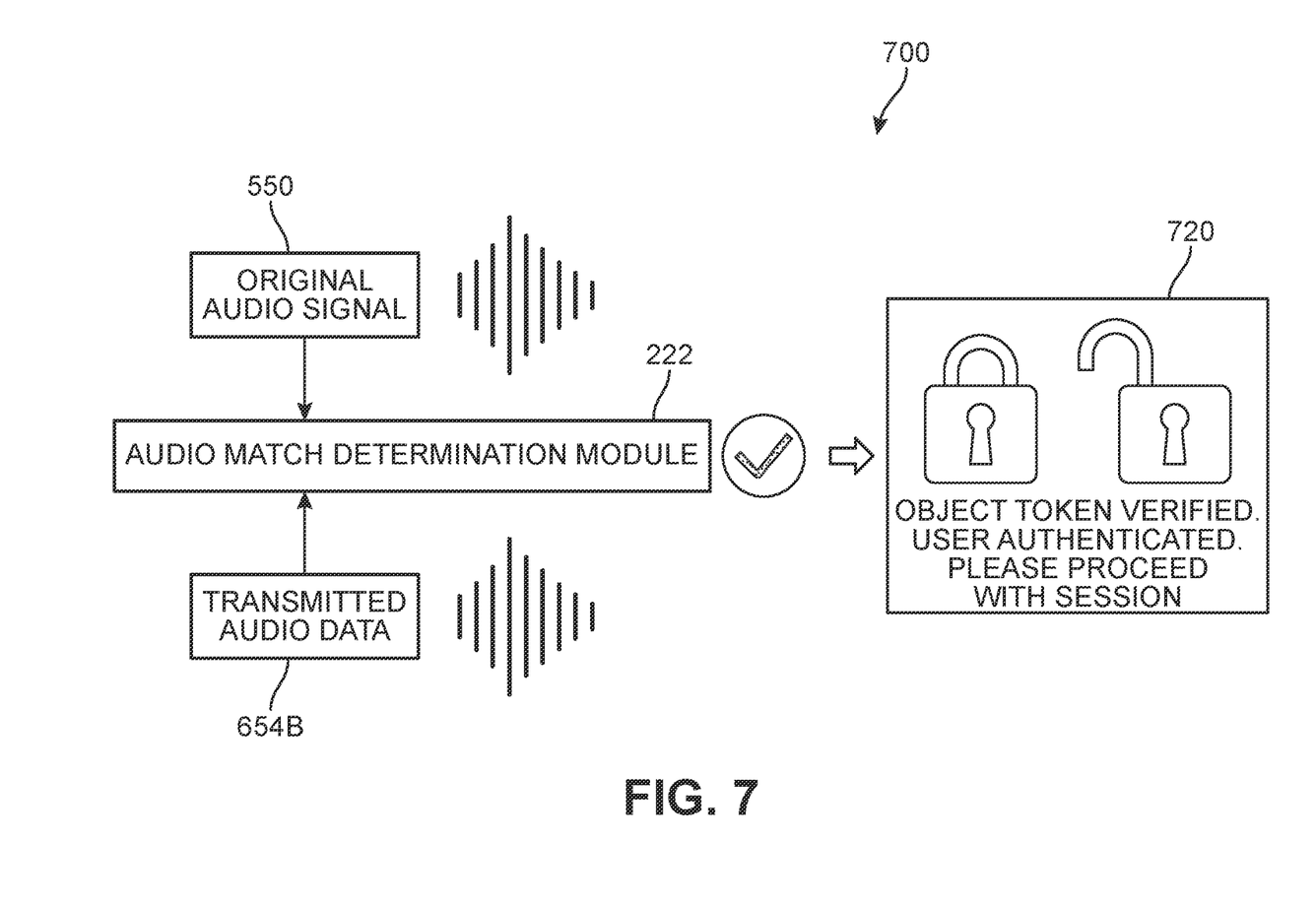
FIG. 7 is a depiction of the two samples of audio data being compared by an audio-based authentication system, and a system determination that the two samples are a match, according to an embodiment.

As shown in the schematic process diagram of FIG. 7, in different embodiments, the transmitted audio data 654B is received by the access management platform and received by the audio match determination module 222 (see FIG. 2). The audio match determination module 222 analyzes the two audio samples (the original audio signal 550 selected by the platform for playback and the transmitted audio data 654B) and compares them. It can be seen that the two samples are substantially similar. In this case, the returned score generated is above the acceptable threshold, and the system determines there is indeed an audio match 720 (indicated by an example system message "Audio signal verified. User authenticated. Please proceed with session"). In different embodiments, in response to the successful match, the agent 312 is now able to provide the second user 322 access to the secured resource. In some embodiments, the system is configured to automatically authenticate the user in response to a positive match and automatically release the corresponding secured resource based on this verification. The user can enjoy increased confidence in the experience of a secure access session that cannot be 'copied' by impersonation of the user's face or voice (e.g., using deep fake technology) or based on knowledge stolen by identity theft.

If, on the other hand, the returned score had been below the acceptable threshold, a failed or negative match message may be presented. In other word, the system would determine that the content of transmitted audio data 654B does not correspond to the original audio signal 550 generated by the system. Upon presentation of this negative result, the agent 312 can be alerted to the greater likelihood of an imposter attempting to fraudulently access the true account holder's secured resources. For example, a negative match can suggest that the caller is not actually in the location that has been asserted. In such cases the agent 312 can simply end the communication session, or can proceed by either reattempting the authentication process or requesting additional verification information to authenticate the user (e.g., security questions, voice recognition, etc.).

Figure 8:
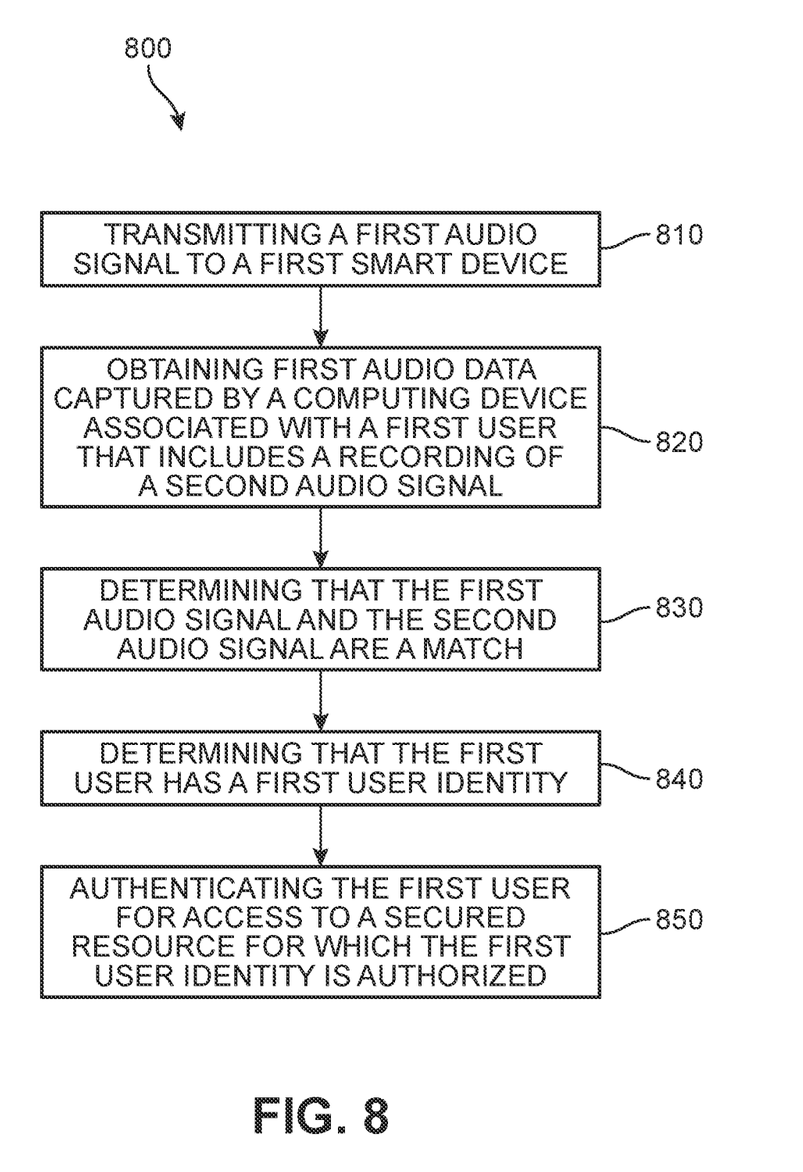
FIG. 8 is a flow chart depicting a process of authenticating a user using audio tokens, according to an embodiment.

FIG. 8 is a flow chart illustrating an embodiment of a method 800 of authenticating an identity of an individual. The method 800 includes a first step 810 of transmitting, at a first time, a first audio signal to a first smart device located in a first (physical) space such as a room in a residence or other building, an outdoor space, or vehicle interior. A second step 820 includes of obtaining first audio data captured by a first computing device associated with a first user. The first audio data includes a recording of a second audio signal. A third step 830 includes determining that the first audio signal and the second audio signal are sufficiently similar to be classified as a match. In addition, a fourth step 840 includes determining, in response to classifying the first audio signal as matching the second audio signal, that the first user has (or has a greater likelihood of having) a first user identity, and a fifth step 850 of thereby authenticating the first user for access to a secured resource for which the first user identity is authorized.

In other embodiments, the method may include additional steps or aspects. In one example, the second audio signal is produced by the first smart device in response to the transmission of the first audio signal. In another example, the first audio data includes also includes ambient sounds for the first space. In some embodiments, the method also includes steps of receiving access information for the first smart device at a second time earlier than the first time, storing the access information in a first record linked to the first user identity, and using the access information to cause the first smart device to produce the second audio signal.

In one embodiment, the secured resource includes one of a service, feature, and information for which access is restricted to one or more authorized persons. In another embodiment, the first audio data is obtained during a telephone or videoconferencing session between the first user and a service representative associated with the secured resource. In different embodiments, the method can include additional steps of receiving location data for the first user corresponding to the first space, and selecting the first smart device based on a tag associated with the first smart device indicating the first smart device is located in the first space.

Other methods can also be contemplated within the scope of this disclosure. For example, a second method of authenticating an identity of an individual is also disclosed. This method comprises a first step of receiving access information for a first smart device located in a first space, and a second step of registering the first smart device with the access information in a first record linked to a first user identity. In addition, the method includes a third step of receiving a request for access to a secured resource from a first user purporting to have the first user identity, and a fourth step of retrieving, in response to the request, the first record. A fifth step includes transmitting a first audio signal to the first smart device using the access information, and a sixth step includes receiving data including a second audio signal from a first user device of the first user. In addition, a seventh step includes permitting or enabling the first user access to the secured resource if or when the first audio signal and the second audio signal are deemed sufficiently similar to be classified as a match.

In other embodiments, this method may include additional steps or aspects. In some embodiments, the method also includes a step of registering a second smart device in a second record linked to the first user identity, where the second record includes a first tag indicating the second smart device is located in a second space. In another embodiment, the method further includes adding a second tag to the first record indicating the first smart device is located in the first space. In one embodiment, the method also involves steps of receiving, from the first user device, information indicating that the first user device is in the first space, and selecting the first smart device based on the second tag.

In different embodiments, the first audio signal and second audio signal are classified as a positive match when the first user device is also near or in the first space. In some examples, the second audio signal is produced by the first smart device in response to the transmission of the first audio signal. In another example, the second audio signal is captured by a microphone associated with the first user device.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authenticating an identity of an individual, the method comprising:
   receiving an assertion of user location from the individual;
   automatically identifying a first smart device, from a collection of preregistered user devices, based on the asserted user location;
   automatically providing a recommendation, with a virtual agent, to a mobile device of the user to move to a first room or space in which the first smart device is located;
   transmitting, at a first time, a first audio signal to the first smart device;
   obtaining first audio data captured by a first computing device associated with the individual, the first audio data including a recording of a second audio signal;
   determining that the first audio signal and the second audio signal are sufficiently similar to be classified as a match;
   determining, in response to classifying the first audio signal as matching the second audio signal, that the individual has a first user identity; and
   thereby authenticating the individual for access to a secured resource for which the first user identity is authorized.

2. The method of claim 1, wherein the second audio signal is produced by the first smart device in response to the transmission of the first audio signal.

3. The method of claim 1, wherein the first audio data also includes ambient sounds for the first room or space.

4. The method of claim 1, further comprising:
   receiving access information for the first smart device at a second time earlier than the first time;

storing the access information in a first record linked to the first user identity; and using the access information to cause the first smart device to produce the second audio signal.

5. The method of claim 1, wherein the secured resource includes one of a service, feature, and information for which access is restricted to one or more authorized persons.

6. The method of claim 1, wherein the first audio data is obtained during a telephone or videoconferencing session between the first user and a service representative associated with the secured resource.

7. The method of claim 1, further comprising:
receiving location data for the first user corresponding to the first room or space; and
selecting the first smart device based on a tag associated with the first smart device indicating the first smart device is located in the first room or space.

8. A method of authenticating an identity of an individual, the method comprising:
receiving access information for a first smart device located in a first space;
registering the first smart device with the access information in a first record linked to a first user identity;
receiving a request for access to a secured resource from a first user purporting to have the first user identity, the request for access including an assertion of user location from the individual;
automatically identifying the first smart device, from a collection of preregistered user devices, based on the asserted user location;
automatically providing a recommendation, with a virtual agent, to a mobile device of the user to move to a first room or space in which the first smart device is located;
retrieving, in response to the request for access, the first record;
transmitting a first audio signal to the first smart device using the access information;
receiving data including a second audio signal from a first user device of the individual; and
permitting the individual access to the secured resource when the first audio signal and the second audio signal are deemed sufficiently similar to be classified as a match.

9. The method of claim 8, further comprising registering a second smart device in a second record linked to the first user identity, the second record including a first tag indicating the second smart device is located in a second room or space.

10. The method of claim 9, further comprising adding a second tag to the first record indicating the first smart device is located in the first room or space.

11. The method of claim 10, further comprising:
receiving, from the first user device, information indicating that the first user device is in the first room or space; and
selecting the first smart device based on the second tag.

12. The method of claim 8, wherein the first audio signal and second audio signal are classified as a positive match when the first user device is also near or in the first room or space.

13. The method of claim 8, wherein the second audio signal is produced by the first smart device in response to the transmission of the first audio signal.

14. The method of claim 13, wherein the second audio signal is captured by a microphone associated with the first user device.

15. A system for authenticating an identity of an individual, the system comprising a processor and machine-readable media including instructions which, when executed by the processor, cause the processor to:
receiving an assertion of user location from the individual;
automatically identifying a first smart device, from a collection of preregistered user devices, based on the asserted user location;
automatically providing a recommendation, with a virtual agent, to a mobile device of the user to move to a first room or space in which the first smart device is located;
transmit, at a first time, a first audio signal to the first smart device;
obtain first audio data captured by a first computing device associated with the individual, the first audio data including a recording of a second audio signal;
determine that the first audio signal and the second audio signal are sufficiently similar to be classified as a match;
determine, in response to classifying the first audio signal as matching the second audio signal, that the individual has a first user identity; and
authenticate the individual for access to a secured resource for which the first user identity is authorized.

16. The system of claim 15, wherein the second audio signal is produced by the first smart device in response to the transmission of the first audio signal.

17. The system of claim 15, wherein the first audio data also includes ambient sounds for the first room or space.

18. The system of claim 15, wherein the instructions further cause the processor to:
receive access information for the first smart device at a second time earlier than the first time;
store the access information in a first record linked to the first user identity; and
use the access information to cause the first smart device to produce the second audio signal.

19. The system of claim 15, wherein the secured resource includes one of a service, feature, and information for which access is restricted to one or more authorized persons.

20. The system of claim 15, wherein the first audio data is obtained during a telephone or videoconferencing session between the first user and a service representative associated with the secured resource.

* * * * *